W. Kenyon. Sheet 1. 3 Sheets.
Nut Mach.
No. 666. Reissued Feb. 15. 1859.
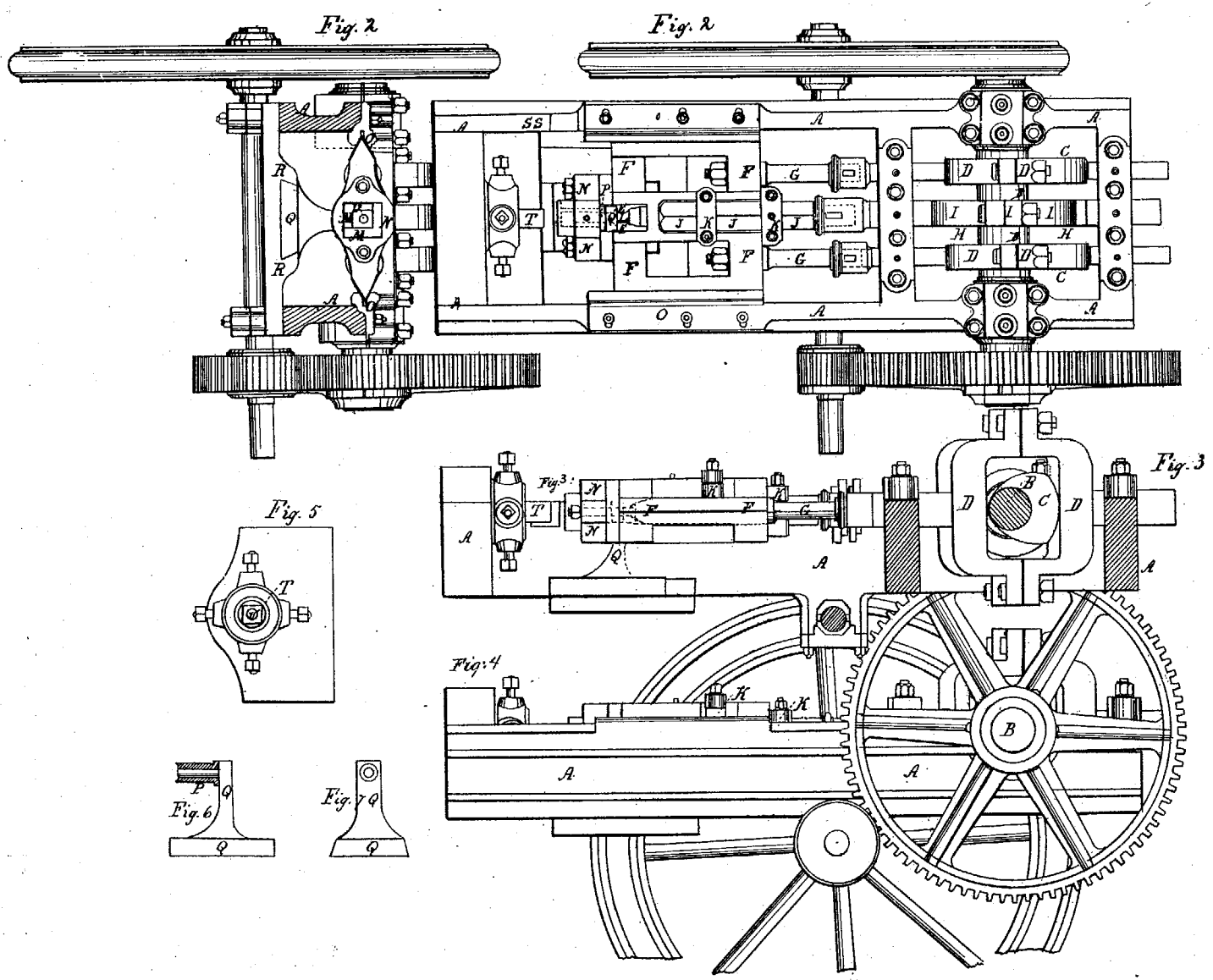
THE NORRIS PETERS CO., PHOTO-LITHO., WASHINGTON, D. C.

W. Kenyon. Sheet 2. 3 Sheets.
Nut Mach.

No. 666. Reissued Feb. 15. 1859.

THE NORRIS PETERS CO., PHOTO-LITHO., WASHINGTON, D. C.

W. Kenyon. Sheet 3 3 Sheets.

Nut Mach.

No. 666. Reissued Feb. 15. 1859.

THE NORRIS PETERS CO., PHOTO-LITHO., WASHINGTON, D. C.

UNITED STATES PATENT OFFICE.

JAMES WOOD, OF PITTSBURG, PENNSYLVANIA, ASSIGNEE, BY MESNE ASSIGNMENTS, OF WILLIAM KENYON.

IMPROVEMENTS IN MACHINES FOR MAKING NUTS, WASHERS, &c.

Specification forming part of Letters Patent No. 8,427, dated October 14, 1851; Reissue No. 361, dated March 18, 1856; Reissue No. 666, dated February 15, 1859.

*To all whom it may concern:*

Be it known that WILLIAM KENYON, of Steubenville, in the county of Jefferson and State of Ohio, has invented certain new and useful Improvements in the Manufacture of Wrought-Iron Nuts for Bolts; and I do hereby declare that the following is a full, clear, and exact description thereof, reference being had to the annexed drawings, forming part of this specification, in which—

Figure 9:
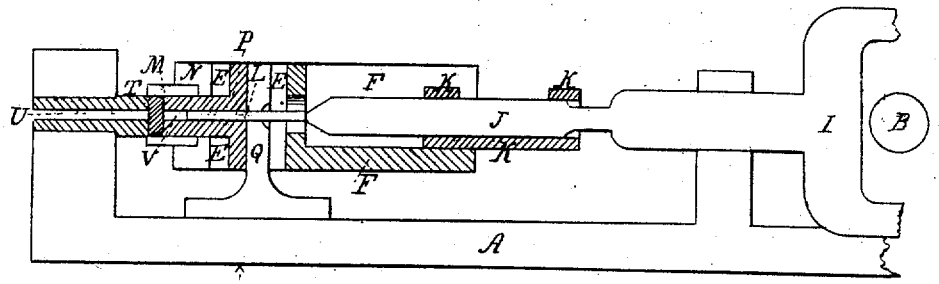
Figure 10:
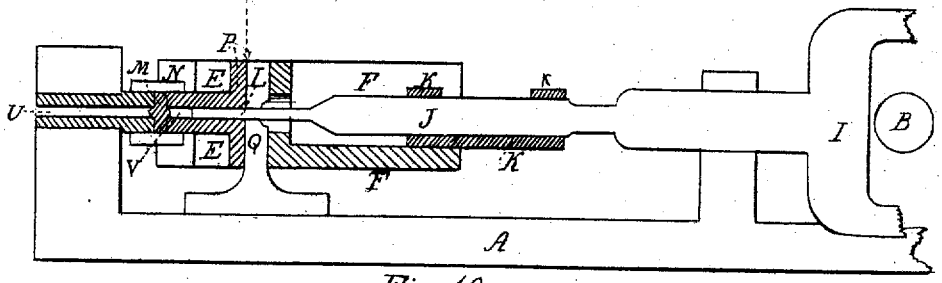
Figure 12:
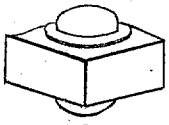
Figure 11:
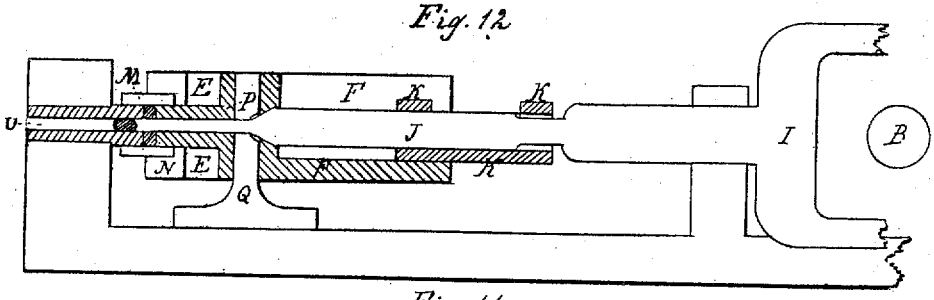
Figure 8:
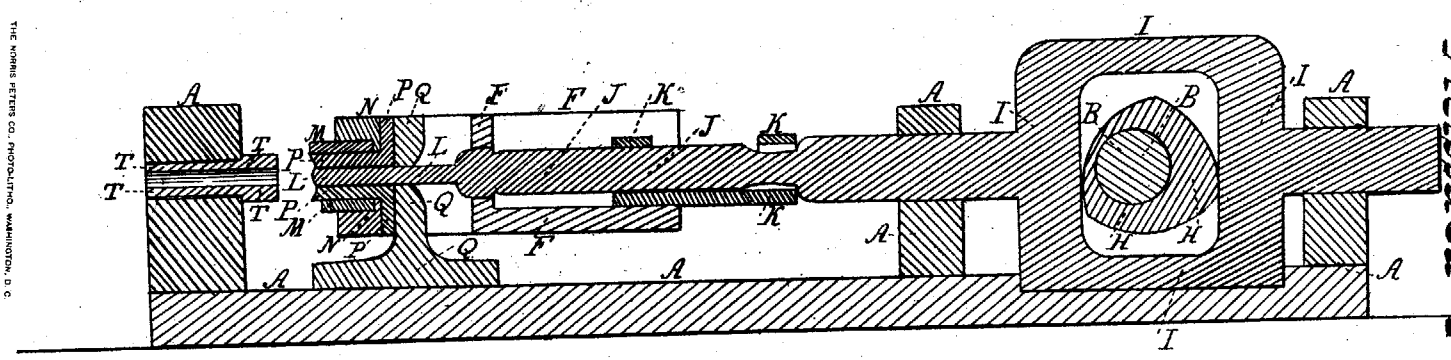

Figure 1 is a top view of the machine used for making nuts. Fig. 2 is an end view thereof. Fig. 3 is a sectional elevation or side view just inside of the side frame of the machine. Fig. 4 is an elevation or side view outside of the frame. Fig. 5 is an end view showing the shape and position of the stationary die. Figs. 6 and 7 are respectively a side and end view of the bracket and moving die. Figs. 8, 9, 10, and 11 are longitudinal sectional elevations through the center of the machine, exhibiting the relative position and shape of the dies and punch. Fig. 8 shows the position of the dies, punch, bracket, &c., before the heated bar of iron is inserted, the punch not being fully drawn back. Fig. 9 shows the position of parts when a blank has been severed from the bar of iron and forced into the close die-box. Fig. 10 shows the position of parts while the blank is being compressed and before it is punched, exhibiting the forcing of the surplus iron into the path of the punch in the compressing dies. Fig. 11 shows the position of parts after the nut is punched and before the withdrawal of the round punch. Fig. 12 shows the appearance of a blank, (or nut after it is pressed and before it is punched,) being the shape given to it by the machine when the punch and dies are in the position shown in Fig. 10.

In the several figures like letters of reference denote similar parts of the machine.

His invention consists in the mode, hereinafter described, of manufacturing nuts for screw-bolts, of considerable thickness, by machinery, by subjecting the blank of which the nut is to be formed, at a welding-heat, to compression between swages or dies, in a close die-box or matrix, for the purpose of welding up any imperfections in the iron and giving a uniform and symmetrical shape to the nut, and punching it by forcing a punch through it while it is thus compressed, thus preventing the bursting or rending asunder of the fibers of the iron, or any other injury which the nut might sustain by the passage through it of the punch, if it were not thus sustained by the sides of the die-box and forcibly compressed between the swages or dies, and in the combination and arrangements of the compressing-dies, punch, and die-box for manufacturing hot-pressed nuts, in the manner hereinafter described; also, in so constructing and arranging the dies that any excess of iron in the blank shall be forced into the path of the punch and be removed by the punch without endangering the breaking of the dies or other parts of the machine, and securing the formation of nuts of nearly uniform size, density, and weight.

To enable others skilled in the art to make and use the machine, I will proceed to describe its construction and operation.

The frame-work of the machine is represented by A A, Fig. 1.

B is the cam-shaft by which the machine is operated. On the cam-shaft are three cams placed side by side—one, H, in the center of the machine, which operates the round punch, and two others, C C, on either side of H. The cams C C are of similar size and shape and of equal stroke, and work in unison to operate the die-box.

D D are cam-yokes surrounding the outer cams, C C.

I is a similar cam-yoke surrounding the center cam, H. The outer cam-yokes, C C, are connected by rods G G to the shoving-head F, which works back and forth in the V slides *o o*. To the shoving head F is attached a frame, N, holding a die-box, M. This die-box M is a strong block of steel, through which, at right angles to its face, is a hole of the precise diameter and shape of the nuts to be made by it, (whether square, hexagonal, or other required form.) The sides of this die-box are smooth and polished so as to give a fine surface to the nuts. A movable die, P, is fitted closely into the die-box M, and when pressed forward exactly fills the die box, as seen in Fig. 8. The face of this movable die P corresponds with the shape to be given to the lower surface of the nuts. It is perforated with a round hole, V, through which works the punch L for punching the eye of the nut. The end of the moving die P rests against the bracket Q, which works in slides R R on the floor of the frame of the machine. Neither the moving die P nor the bracket Q receive motion immediately from the cams, not being rigidly attached to any part of the machine, the die P moving with the shoving-head F, and the die-box, (excepting when it comes in contact with the bracket Q,) and the bracket Q, projecting upward into the space E in the shoving-head back of the moving die P, remains stationary until it (the bracket) comes in contact with the shoving-head at either end of the space E.

The center cam, H, is a cut-off cam, and is designed to give the round punch L a quick backward and forward motion at the moment that the nut is fully pressed and before that pressure is discontinued. J is a strong iron bar or connecting-rod connecting the cam-yoke I of the cam H with the round punch L. The punch L fits into the round hole V in the moving die P, and also into a corresponding hole, U, in the stationary die T. The bar J is sustained by and slides in rests K K, and the end of the round punch L is supported by the moving die P, in which it works. T is a stationary punch, which fits exactly into the matrix or die-box M, when the die-box M, being pushed forward by the shoving-head F, passes, as a sleeve, over the stationary die T.

The names "stationary die" T and "moving die" P are used instead of "punch" and "mandrel" to avoid confusion, reserving the name "punch" for the round punch L for better distinction.

Having thus described the several parts of the machine, I will proceed to explain its operation and the objects it is designed to accomplish.

The machine thus constructed is designed to make nuts for screw-bolts out of bars of iron heated to a welding-heat by severing from the bar a blank between the die-box M and the stationary die T, forcing it into the die-box M, and while it is sustained laterally by the sides of the close die-box M, and on one face by the stationary die T, squeezing or compressing it between the compressing-surfaces of the stationary die and moving die, and then punching the eye during the continuance of this pressure. The importance of the compression of the blank out of which the nut is to be made arises from the fact that imperfections frequently exist in bars of rolled or wrought iron, making it necessary to compact the fiber of the iron and weld up all seams, fissures, or other imperfections, which, if allowed to remain in the finished nuts, would seriously impair their strength and render them unsafe whenever they have to sustain great pressure or strain, as is the case where they are used in the construction of bridges, locomotives, and machinery generally. The compression of the blank is also necessary to weld up any imperfections or twisting of the iron caused by severing the blank while red-hot and forcing it into the die-box. In order to prevent the straining and bursting of the nut, which would otherwise ensue in passing the round punch through it to form the eye, it is necessary to continue the pressure of the nut within the close die-box between the compressing-surfaces of the moving and stationary dies during the process of punching and until the punch is withdrawn from the nut. During this compression it is also necessary that the nut should be confined in a strong and close die-box in order that its sides may be sustained; otherwise the compression on its upper and lower surface would serve but to press the blank out and reduce its thickness without accomplishing the important object above stated. The compressing-surfaces of the moving die P and stationary die T, being in parallel planes, serve to hold the nut straight in the die-box and prevent it tilting over, and thus secure the passage of the round punch L (which forms the eye of the nut) through the nut at right angles to its upper and lower faces; or, if it is designed to make a nut with a skew face—that is, to have the eye or hole at any other than a right angle to its face—this is secured by giving the requisite inclination to the compressing-faces of the moving and stationary dies. This compression of the nut in the close die-box between the moving and stationary dies and continuing the pressure during the process of punching not only accomplishes the results above stated, forming a strong and compact nut, but also gives great smoothness and finish to the eye of the nut, and also to its exterior surface, thus making nuts of uniform size and weight and smooth and handsome finish.

The peculiar arrangement and construction of this machine obviate a difficulty which would be experienced in attempting to punch the nut before pressure by forcing the blank over a stationary punch and then pressing it around the punch within the die-box, where the bar of iron is so thick as not to bear compression to the required thickness of the nut. It is important that the bar of iron from which the nut is to be made should not be at all thinner than the distance between the compressing faces of the movable and stationary dies at the point of greatest compression, because the nut would not in that case be pressed at all and would be ruined by punching. If, on the other hand, the bar of iron were at all too thick, and the nut were pressed in a close die-box around the punch, there being no escape for the excess of iron, the machine would either stop or be broken, or the die-box would burst when the cam passed the center at the point of greatest compression. This difficulty is obviated by pressing the blank in the close die box, between the compressing-surfaces of the moving and stationary dies before the round punch is advanced to punch the nut, thus allowing the excess of iron to be forced into the path of the punch in the moving and stationary dies and afterward punching the nut during the continuance of the pressure on the blank. For this purpose there is used a moving punch, L, which, when the blank is severed from the bar of heated iron, is partially withdrawn from the moving die P, as seen in Fig. 9, and when the blank is compressed between the dies M and T (see Fig. 10) the surplus iron which will not compress into the body of the nut is allowed to escape, being squeezed out into the round hole forming the path of the punch in the moving and stationary dies. This makes the nut before it is punched of the shape shown in Fig. 12, with a projection or nipple on either or both sides where the eye is to be, which is subsequently removed by the punch. Thus the use of iron which is a little over thick insures the requisite amount of pressure on the nuts. This plan also serves to give vent for any fixed air, or the coarser particles of metal, which may be squeezed into the core and removed in the punching, and the blank, thus highly compressed in the close die-box and between the dies, cannot be strained, burst, or otherwise injured by the passage of the punch through it, and the hole through which the excess of iron is forced being so small in comparison with the whole nut that it does not in any way interfere to prevent the full and complete compression of the iron and welding up of all imperfections. The use of a movable instead of a stationary punch also obviates the difficulty of the softening of the punch by overheating, which would occur if the hot nut were forced over and pressed around it in the first instance.

The operation of the machine is as follows: When the several parts of the machine are in the position shown in Fig. 8, (excepting that the round punch L should be drawn a little farther back within the moving die P), the bar of iron of which the nuts are to be made at a welding-heat is inserted through the slot S (seen in Fig. 1) in the side of the machine until the end of the bar rests against the face of the stationary die T or of the moving die P, the space between the stationary die T and moving die P being regulated, as occasion may require, so as readily to admit the insertion of the bar of iron between them. In this position of the parts of the machine the shoving-head F is drawn fully back, and with it the die-box M and moving die P, the moving die P being forced into the die-box M by contact with the bracket Q, so that the face of the moving die is flush with the edges of the die-box. The bracket Q has a very short movement between the points 1 and 2 in Fig. 10. The heated bar of iron being inserted, as just stated, a partial revolution of the cam-shaft B causes the outer cams, C C, to advance the shoving-head F, and with it the die-box M, toward the stationary die T. The bracket Q remains stationary, as also does the moving die P, which rests against it, while the die-box M advances from the bracket Q toward the stationary die T, and, pressing the heated bar of iron against the stationary die T, severs from it a blank for the nut. The die-box M (still advancing) forces the blank (severed from the heated bar by the edges of the stationary die T and die-box M) to enter the die-box, the blank being sustained by the movable die P and stationary die T, and thus prevented from tilting or getting out of place in the die-box M. As the blank enters the die-box M, the movable die P remains stationary while the die-box M is advancing as a sleeve over the movable and stationary dies, which hold the blank between them, the movable die P being still prevented from receding by the bracket Q. When the blank has fully entered the die-box, or, strictly speaking, when the die-box has passed over the blank which is held between the two dies, as seen in Fig. 9, the shoving-head F has advanced so far toward the stationary die T that the rear edge of the space E now touches the bracket Q, and the shoving-head F, still advancing with the die-box M, presses the bracket Q also forward, causing the movable die P to advance in the die-box M toward the stationary die T, and now the pressure of the blank between the dies T and P inside the close die-box M commences, and increases until the shoving-head F has caused the bracket Q to advance from point marked 1 to 2 in Fig. 10. It will be seen by examining Fig. 10 that the advancing of the die-box M, when the nut is being pressed, does not cause the movable die P to advance in it, and that it is only when the shoving-head F presses against the bracket Q that this effect is produced. The blank being thus strongly squeezed or compressed between the dies T and P, while its sides are sustained by the sides of the die-box M, the surplus metal is forced into the holes in the dies T and P, being the path of the punch L. The center cam, H, at this point begins to act on the bar J, giving to it a rapid forward and backward motion, the forward motion of the bar J causing the sudden passage of the punch L through the moving die P and through the blank into the stationary die T, while the compression of the blank between the dies and the die-box is still continued. The "punching" is forced through the stationary die T and discharged through the round hole U. The punch is then as suddenly withdrawn by the backward movement of the bar to prevent its becoming heated by contact with the hot metal, and then, and not till then, the pressure on the nut is relieved by the receding of the shoving-head F, which is drawn back by the cams C C. The finished nut is then discharged from the die-box as follows: As the shoving-head F is drawn backward, the back of the movable die P, projecting from the die-box M behind and resting against the bracket Q, causes the bracket Q to recede as far back as it can go—that is, from 2 to 1 in Fig. 10. The bracket Q and die P then, of course, remain stationary, but the die-box M still receding with its shoving-head F, the bracket Q, forces the movable die P up in the die-box until it comes even with the face of the die-box, when the nut drops out, the machine assuming its first position.

The operation just described is performed in one revolution of the cam-shaft B, which may be made to revolve as rapidly as the iron bar can be fed in.

The machine as described has dies working horizontally; but it is manifest that it may be arranged to work perpendicularly, if preferred, or the punch be made to move through the stationary instead of the movable die, without altering the principle or impairing the action of the machine. So, also, there may be various modifications in the construction and arrangement of the parts of the machine which it is unnecessary to describe, and also in the order of operation, as by commencing the compression of the nut after the passage through it of the screw-punch, which is a mere modification, accomplishing the same result, though not so well. It is neessary, however, that the nut should be compressed in a close die-box before the screw-punch is withdrawn from it.

Having thus described WILLIAM KENYON'S improvement in the manufacture of nuts, what I claim therein as his invention, and desire to secure by Letters Patent, is—

1. Making nuts for bolts by subjecting the blank of which the nut is to be formed, at a welding-heat, to compression between swages or dies in a close die-box or matrix and punching the eye of the nut during the continuance of such pressure, for the purpose of welding up any imperfections in the iron and giving a symmetrical shape and smooth finish to the nut, and of preventing any injury to the nut which it might suffer by the passage of the punch through it if it were not thus sustained by the sides of the die-box and forcibly compressed between the dies.

2. The use of a die-box, closed at the sides, for surrounding the nut and sustaining its sides while it is subjected to pressure, substantially in the manner hereinbefore described.

3. The combination of the compressing-dies P and T with the die-box M, for the purpose of compressing the nut while it is sustained at the sides, and thus welding up any imperfections in the iron and compacting its fiber, so as to give strength as well as exterior finish and symmetry to the nut.

4. The combination of the punch L with the die-box M and compressing-dies P and T, for the purpose of compressing, confining, and restraining the opposite faces of the nut during the passage of the punch through it, and thus preventing any injury to the nut during the process of punching, and also for the purpose of insuring the making of the bore of the nut in the proper relative position to its upper and lower surfaces.

5. The combination of the die-box M, the compressing-dies T and P, and punch L, constructed and arranged substantially as hereinbefore described, for the purpose of making hot-pressed nuts at a single operation by severing a blank from a bar of heated metal, compressing it into shape, and punching a hole or eye through it while under compression, and delivering the finished nut from the machine.

6. Arranging the compressing-dies in relation to the punch and regulating their relative motion in such manner, substantially as hereinbefore described, that any excess of iron in the blank shall be forced into the path of the punch in the compressing-dies, thus securing the compression of the nut without risk of damage to the machine.

JAMES WOOD.

Witnesses:
MARTIN G. CUSHING,
ROBT. W. WILSON.